Aug. 17, 1948.  C. GOLDBLATT  2,447,329
ADJUSTABLE COUPLING FOR WRIST WATCH BANDS
Filed Jan. 6, 1948  3 Sheets-Sheet 1
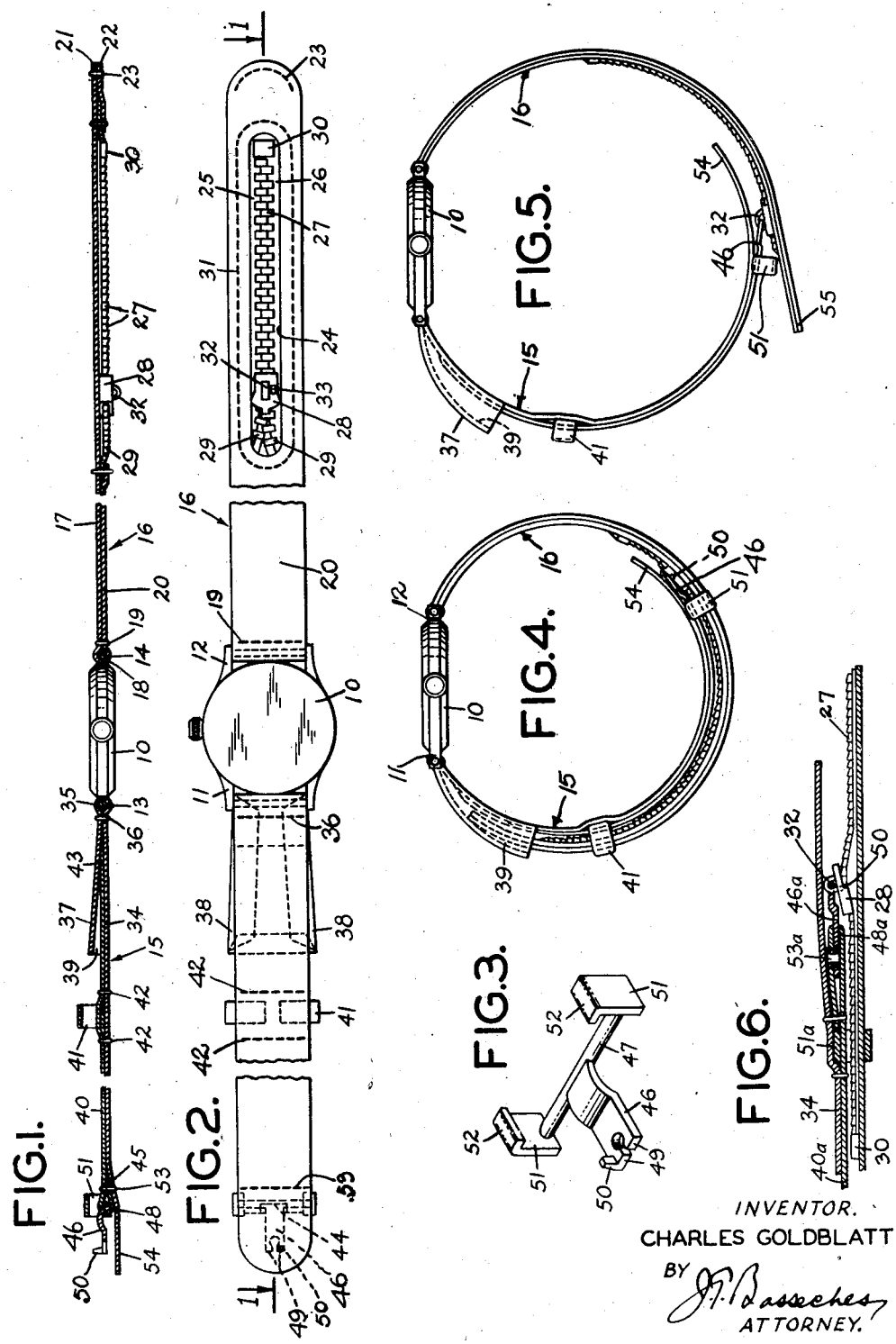
INVENTOR.
CHARLES GOLDBLATT
BY J. T. Basseches
ATTORNEY.

Aug. 17, 1948.    C. GOLDBLATT    2,447,329
ADJUSTABLE COUPLING FOR WRIST WATCH BANDS
Filed Jan. 6, 1948    3 Sheets-Sheet 2
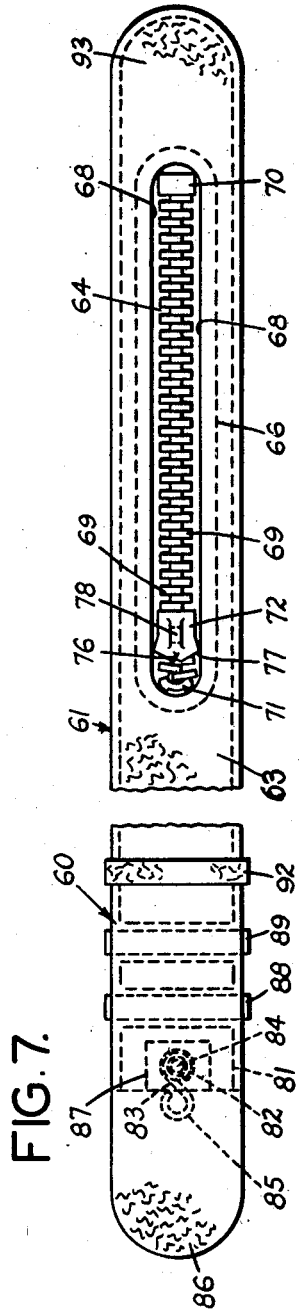
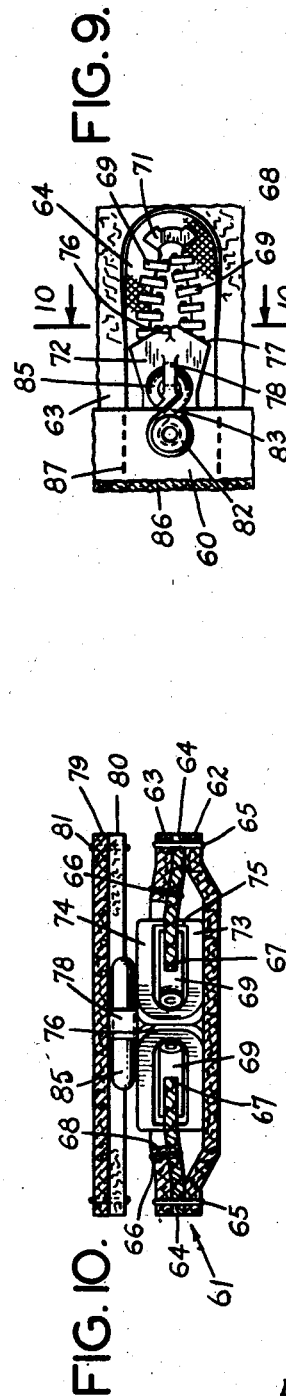
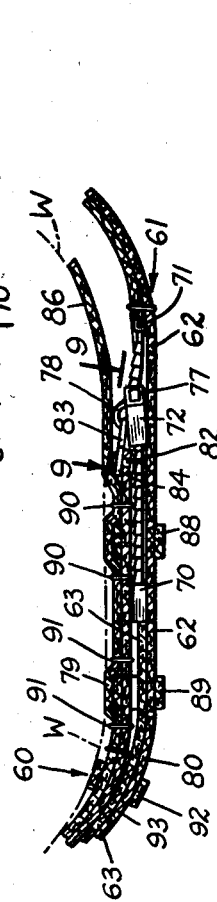
INVENTOR.
CHARLES GOLDBLATT
BY
J. F. Basseches
HIS ATTORNEY.

Aug. 17, 1948.  C. GOLDBLATT  2,447,329
ADJUSTABLE COUPLING FOR WRIST WATCH BANDS
Filed Jan. 6, 1948  3 Sheets—Sheet 3
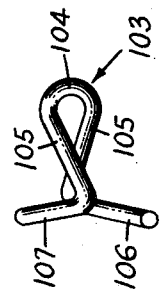
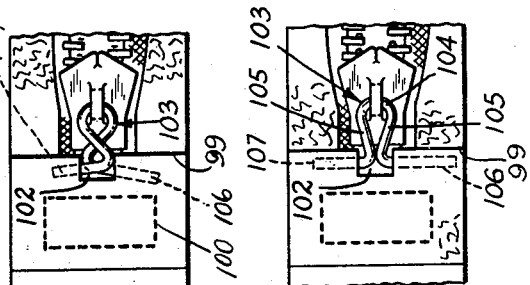
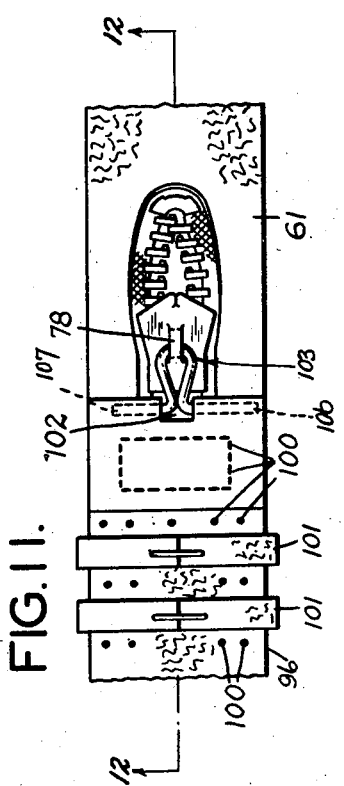
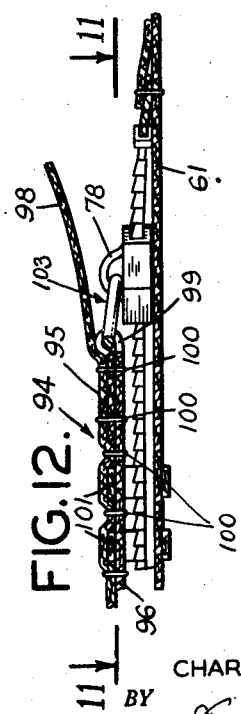
INVENTOR.
CHARLES GOLDBLATT
BY
HIS ATTORNEY.

Patented Aug. 17, 1948

2,447,329

UNITED STATES PATENT OFFICE 2,447,329

ADJUSTABLE COUPLING FOR WRIST WATCH BANDS

Charles Goldblatt, New York, N. Y.

Application January 6, 1948, Serial No. 670

9 Claims. (Cl. 24—68)

1

This invention relates to adjustable couplings, and more particularly to couplings for flexible bands and still more particularly to couplings for wrist watch bands or the like.

This invention is a continuation-in-part of my invention described and claimed in my application Serial No. 761,305, filed July 16, 1947, and is an improvement over my invention described and claimed in application Serial No. 552,149, filed August 31, 1944, now Patent No. 2,424,656 and in my application Serial No. 722,395, filed January 16, 1947.

In accordance with my invention in said patent, I have described and claimed a variable coupling for joining the ends of bands, such as wrist watch bracelets, in which a retainer member has a cooperating element, a layer comprising longitudinally directed stringers and a slider actuated separable fastener to hold said band portions in overlapping adjustable position.

In my application Serial No. 722,395, I have extended the relationship of the stringers and actuator thereof in a way so that the manipulation of the actuator carries with it a terminal end of a band portion in adjustment of the bands with respect to each other, including provision for having the manipulative handle for said actuator anchor the actuator in any adjusted position.

I have found that where the specific features in accordance with my prior inventions are employed, especially in a wrist watch band, that the coupling and uncoupling action is not conveniently carried out except by a manipulation which requires the use of both hands.

Accordingly, it is an object of my invention to provide a coupling for joining the terminal ends of flexible band portions or the like in which the adjustable relationship of the band portions to each other in overlapping position may be quickly and easily effected, and locking engagement secured by manipulation which may be performed simply and readily with one hand. Still more particularly it is an object of my invention to provide a coupling for joining band portions of flexible material, such as leather or the like, in which coupling is provided by interengagement of cooperative portions of the fastener elements of slide fasteners, or what is commonly known as zippers.

Still more particularly, it is an object of my invention to provide a coupling for joining a pair of band segments in overlapping relationship to adjust their relative position to each other, in which closely positioned abutment members comprising fastener elements along a stringer in co-

2 operation with a manipulating member for a guide provides the means for setting and locking the band portions along their lengths to each other, whereby operation may be simply and easily effected to secure, with one hand, an adjustment of the overlapping portions with relation to each other, to bring the overlap of the elements to be coupled in greater or lesser overlapping position, and to hold, by locking action, or by frictional action, the coupling in the overlapped position.

Still more particularly, it is an object of my invention to provide a coupling for joining a pair of band segments in overlapping position by the cooperative engagement secured by employing the fastener elements of a so-called zipper construction as the abutments, or wear-resisting parts of a flexible band member and the slidable actuator as the guide and terminal connector for the other band member, whereby the band segments may be adjusted in overlapping position and locked in such overlapping position by a simple manipulative adjustment.

Still more particularly, it is an object of my invention to provide a wrist watch band or bracelet which may be adjusted quickly and easily and provide a highly ornamental facing without perforations while securing a wide latitude of adjustment.

Still more particularly, it is an object of my invention to provide a coupling for connecting band portions, particularly those forming the parts of a wrist watch bracelet, in which the band portions are held in overlapping position to provide compactly arranged layers, and including novel means of assembly to obtain security, comfort, and long life in use.

To attain these objects and such further objects as may appear herein or be hereinafter pointed out, I make reference to the accompanying drawing, forming a part hereof, in which—

Figure 1 is a longitudinal sectional view of the band and coupling therefor in connection with a wrist watch strap taken on the line 1—1 of Figure 2;

Figure 2 is a plan view thereof;

Figure 3 is a magnified perspective view of a coupling element;

Figure 4 is an end view showing the wrist watch bracelet in the contracted condition;

Figure 5 is a similar view showing the wrist watch bracelet in the expanded position;

Figure 6 is a fragmentary section of another embodiment of my invention;

Figure 7 is a plan view of a pair of band portions of a wrist watch strap in unconnected positions thereof, in accordance with another embodiment of my invention;

Figure 8 is a magnified fragmentary sectional view with the band portions connected and in a position corresponding to Figure 6;

Figure 9 is a fragmentary magnified view taken on the line 9—9 of Figure 8;

Figure 10 is a section taken on the line 10—10 of Figure 9;

Figure 11 is a fragmentary plan view in accordance with another embodiment of my invention, corresponding to the view shown in Figure 9, taken on the line 11—11 of Figure 12;

Figure 12 is a section taken on the line 12—12 of Figure 11;

Figure 13 is a perspective view of a connecting link;

Figures 14 and 15 are progressive assembly views employing the link of Figure 13.

Making reference to the drawing, I have illustrated variable couplings joining flexible band portions such as the leather or like band portions of a wrist watch bracelet. In the views, the wrist watch 10 has the loops 11 and 12 for carrying the usual spring lugs 13 and 14, to which band portions may be attached. In accordance with my invention, one loop 11 is provided with a band portion 15. The loop 12 has affixed to it the second band portion 16. The band portion 16 is made from a length of sheeting material such as leather, having a top layer 17 folded at 18 to provide a loop by the stitch line 19 joining the underlayer 20. The free co-terminous ends 21 and 22 are joined by a row of marginal stitches 23.

The underlayer 20 is formed with a cut out slot 24 forming a recess retaining stringers 25 and 26, having complementary slide fastener elements 27 and a slide fastener actuator or slider therefor 28. The usual stops 29 are provided on the inner end of the stringers and the loop stop 30 adjacent the outer end of the stringers.

The slider 28 is positioned so that the camming action for the slide fastener elements 27 tends to disengage the slide fastener elements 27 in moving from the stops 29 toward loop stop 30. Vice versa, to unlock the slide fasteners movement is effected in the opposite direction.

An assembly comprising the stringers 25 and 26 may be sandwiched between the layers 17 and 20 and sewn in position by a peripheral line of stitches 31.

The slider or actuator 28 is provided with a loop 32 adjacent an aperture 33 which makes the spaced fastener elements 27 accessible for purposes of locking the actuator or slider along the length of the stringers, as will be more particularly described hereinafter.

The band portion 15 comprises a length of material similar to that described in connection with the member 16 and includes a bottom layer 34 which is looped at 35 to receive the spring lug 13. A row of stitches 36 defines a loop from the fold at the end. The end 37 has side wings 38 which are folded down and stitched to the underlayer 34 to form a pocket 39. A facing layer 40 is stitched down to the underlayer 34, extending rearwardly to hold down the loop 41 by the rows of stitches 42.

The inner end of the facing layer 40 extends into the pocket portion 39 adjacent one end 43 of the band portion 15. The facing layer 40 is provided with a slot 44 adjacent its end 45, to receive the locking tongue 46, extending from the cross pin 47 about which the loop 48 is formed.

The locking tongue 46 is provided with inwardly directed pintles 49 arranged to engage the loop 32, of the actuator or slider 28, previously described. A transverse locking pin 50 extends from the end of the locking tongue and is arranged upon pivotal movement of the tongue 46 in parallelism with the band 16 to enter the slot 33 of the actuator or slider 28, previously described.

After looping the fold 48 about the cross pin 47, the terminal end 45 may be stitched down by the row of stitches 53.

With the assembly thus provided, the lower layer 34 includes a tongue 54 which is arranged to extend for a distance to form a liner, as will appear hereinafter. With the construction as provided, also, assembly in bracelet fashion is effected by joining the pintles 49 with the loop 32, more clearly shown in Figures 4 and 5.

In the extended limiting position as shown in Figure 5, it will be observed that the operation of the assembly is as follows:

Upon sleeving the braclet over the wrist, the operator may grasp the free end of the band portion 16 adjacent the tongue 55 and pull it away from the wrist. This operation tilts the locking tongue to disengage the transverse locking pin from the path of the slide fastener elements 27. Continued tension on the tongue 55 will serve to slide the slider or actuator 28 to the desired position encircling the wrist to the limiting position desired by the wearer. Thereupon the locking tongue 46 may be pressed in parallelism with the row of slide fastener elements to direct the locking pin 50 into locking engagement with the slide fastener elements 27. Further pressure on the tongue 46 will serve to direct the free end of the band such as the tongue 55 between the fingers 51—51, holding the tongue 55 in position. The free end of the tongue 55 may thereafter be threaded through the loop 41 and then directed in the pocket 39. The position shown in Figure 4 will thereupon be assumed by the bracelet.

For disengagement of the bracelet from the wrist, the reverse process is involved, including first removal of the tongue 55 from engagement with the pocket 39 and loop 41 respectively, whereupon an angular position of the free end of the tongue 55 to the position shown in Figure 5 is effected by prying action on the inner layer 34 adjacent the locking tongue 46. This will serve to permit the slider or actuator to be slid to the limiting position adjacent the stop 30, whereupon the bracelet may be slid off the wrist or adjusted to any other position permitted by the expansion of the bracelet.

Thus it will be observed that speedy adjustment of the bracelet may be effected to the enveloping position snugly fitting the wrist, or to the extended position, permitting removal. It will also be observed that the tongue 54 forms a lining covering the actuator or slider in relation to the body or skin of the wearer.

It will be observed also that while I have described and illustrated the cross pin 47 and fingers 51 to provide a retaining member to hold the tongue 55 in a position directing the locking pin 50 into locking position with the slide fastener elements, other locking or holding mechanism for the locking tongue 46 may be employed.

It will be observed that while I have provided the cross pin 47 and the retainer fingers 51 in spaced relationship for clipping by detent action the tongue 55 in position, I may provide a flexible loop and thread the tongue 55 therein, thereby to provide a retaining member for the band portion carrying the tongue 55, and thereby hold the locking tongue 46 in the position preventing sliding movement of the actuator or slider 28 along the length of the stringers (as shown hereafter—see Figures 7 to 15).

In Figure 6 I have shown a construction wherein the locking tongue 46a is directed to be sandwiched in the loop 48a and held in position by an eyelet 53a. The layer 40a is sewn in position over the layer 34a after positioning a loop 51a between these layers, thereby providing a retaining loop in a position adjacent the locking terminal to receive the free end 55 threaded therethrough and hold the locking tongue 46a in a position directing the locking pin through the actuator or slider 28 against sliding movement along the length of the locking members 27.

In all other respects, simplified manipulation is possible to variably adjust the band portions 15 and 16 in overlapping position.

In the embodiment of Figures 7 to 10, I have shown a construction in which band portions 60 and 61 have embodied additional features of flexibility and compactness to assure comfort when worn as a wrist watch strap. The band portion 61 is formed with an outer layer or facing layer 62 and an inner layer 63 which may be leather. The layers 62 and 63 sandwich therebetween the opposed stringers 64 of fabric, woven to be indistensible and to hold the same together, there is applied the rows of stitches 65 and 66. The stringers 64, at their inner ends 67, lie beneath the longitudinal opening 68 formed in the layer 63. The meeting edges of the stringers are joined by separable complemental fasteners 69. The stringers 64 are provided at one end with a loop stop 70 transversely of the same, and at the opposite end of the stringers with an arcuate loop stop 71.

The stringers 64 and the complemental fasteners 69 are joined by an actuator or slider 72 which has front and back wings 73 and 74, and end flanges 75 joined by the central web 76 to embrace the rear and front faces, respectively, of the edge of the stringers 64 and the fasteners 69 carried thereby. The web 76 adjacent the funnel 77 of the slider is constricted by crimping to provide the minimum flare sufficient to engage and disengage the separable fasteners 69 and thereby minimize the displacement of the stringers and fasteners 69 from the plane of the inner layer 63. The relationship of the separable fasteners 66 to each other and the slider 72 is adjusted to lock frictionally the slider 72 along the length of the stringers in the actuation of the same to and from the position between the transverse stop 70 and the arcuate stop 71.

The slider 72 is provided with a loop 78, forming an eye to receive the connecting link adjacent the end of the band portion 60. The band portion 60 is formed with an outside facing layer 79 and an inside layer 80, stitched together by the rows of stitches 81 to provide the loop at one end to engage the usual spring lug of the wrist watch. The outer layer 79, at its extreme end, is provided with an anchoring eyelet 82, about whose shank there is affixed the link 83, to encircle the loop thereof 84 about the eyelet and between the layers 79 and 80 at this end of the band portion, and projecting the loop portion 85 to one side of the tongue 86. A row of stitches 87 close to the eyelet 82 forms a pocket about the same and the inner loop 84 of the link 83. The outer loop 85 is passed through the loop 78 of the slider 72 to join the opposed band portions 60 and 61 with each other. The band portion 60 is provided with loops 88 and 89 and held against sliding by the transverse rows of stitches 90 and 91, respectively. A loop 92 may freely slide along the length of the band portion 60.

With the construction described, the circlet formed by the connected band portions 60 and 61 is passed over the hand and onto the wrist by pulling against the shank 83 to move the actuator adjacent the transverse stop 70, extending the end 93 outwardly. Upon reaching the desired position on the wrist, the fingers of the free hand may then grasp the end 93, to direct the tongue 86 to the desired encircling position beneath the layer provided by the second band portion 81 and between the wrist W and said band portion 61. In this position, the end 93 is threaded through the loops 88 and 89, whereupon the sliding loop 92 is moved to a position where it may overlap the end 93 and hold the same in parallelism with the band portion 60.

It will be observed that in the encircling position of the band, the slider, by reason of the interengagement of the fastener element 69 on the oppositely disposed stringers 64, maintains the point of anchorage substantially in the plane of the stringers 64, to bring the overlapping ends of the bands 60 and 61 in close proximity to each other, and with a tendency to follow the contour of the wrist with comfort and without undue bulk.

For removing the bracelet from the wrist, the end 93 is withdrawn from the loops 88, 89 and 92, whereupon a finger need only be inserted at a point beneath the link 83 and pulled to enlarge the bracelet to the point where it may be slipped over the hand or pushed further onto the arm. Thus, one handed operation may be secured.

In the constricted position, the pressure of the wrist against the tongue 86, coupled with the frictional engagement of the actuator slider and separable fasteners with each other, effects frictional locking action, preventing displacement of the circlet from the wrist, without requiring positive locking action, as afforded by the locking tongue 54 in the prior embodiments.

In Figures 11 and 12, I have shown a still further embodiment of my invention including means to secure a permanent engagement between the overlapping band portions to provide a complete circlet when formed in a wrist watch bracelet, for securing a compact arrangement of the various layers with a high degree of comfort, security and long life in use, and which permits the completion of all the leather working operations, before assembling the band portions with each other, by joining the slider with the terminal end of the overlapping band portion.

In this embodiment, the band portion 94 comprises an inner layer 95, an outer layer 96, joined at one end to provide the customary spring lug loop. The opposite end includes a tongue 98 and a loop 99, which is stitched to the tongue 98 by the rows of stitches 100, after insertion of the pair of guide loops 101 in a position corresponding to the loops 88 and 89 in the prior embodiment. A medial slit 102 is provided at the end of the loop 99, for purposes which will appear hereinafter.

The complemental band portion in all respects corresponds to the band portion 61 in the prior embodiment and only the union of the terminal ends of the loop 99 to the loop 78 on the slider 72 by some link is required. For this purpose, I provide a stiff link 103, as illustrated in Figure 13.

This link is formed with an eye portion 104, two shank portions 105 terminating into elbow portions 106 and 107 by bending the metal at right angles to the shanks. The elbow portions 106 and 107 are of dissimilar length, and in the position shown in Figure 13 are crossed to overlie each other in spaced relationship.

With a link as thus described, one end of the elbow portions 106, 107 is directed or threaded into the perforation provided by the loop 78 of the slider, to position the link 103 so that the eye 104 engages the loop 78 as shown in Figure 14, whereupon the elbows 106 and 107 are spread and directed in opposite directions, to enter the loop 99 to each side of the slit 102 and flattened into a single plane, permanently connecting the two band portions with each other.

In this construction, the branches 105 are sufficiently extended to permit nesting of the loop 99 in the same plane as the loop 78, forming compact layers, in the overlapping relationship of the band portions.

It will be observed that while I have described and illustrated the band portions 15 and 16 as part of a bracelet for a wrist watch which may employ flexible material, such as leather or the like, it will be understood that the terminal portions corresponding to the spring lug engaging loops 18 and 35, respectively, may be part of other articles where adjustable coupling may be desired.

It will also be observed that while I have described and illustrated the pintles 49 and loop 32 in the embodiment shown in Figures 1 to 6, the link 83 and loop 78 in Figures 7 to 10, and the link 103 in Figures 11 to 15, in permanent engaging position to provide a complete circlet when formed in a wrist watch bracelet, it is contemplated by me to removably couple these connecting portions to permit, as part of the initial operation, an engagement before adjusting the overlapping ends of the band portions in the desired engaging position. Such attachment and operation permit the coupling to form part of an article of apparel, such as a belt, shoulder straps of lingerie, or the like. Other applications will occur to the skilled worker.

In all of these constructions, however, it will be observed that simple manipulation may be effected, requiring a single hand for effecting this operation or any adjustment. The complete absence of any perforations on the facing layers adapts my invention for use in connection with various articles of apparel, in which the strength of the facing is not of any material consequence.

Having thus described my invention and illustrated its use, what I claim as new and desire to secure by Letters Patent, is:

1. A variable coupling for joining the opposed terminal ends of flexible band sections in adjustable relation to each other in overlapping position so that one of said sections overlies the other, the overlying section having its rear face provided with a layer having stringers and separable fastener elements joined into operating engagement by a slider, and a connecting link adjacent the terminal end of the underlying band section connecting the same to said slider whereby pulling the terminus of the overlying section will effect adjustment of the overlying band section in relation to the underlying band section.

2. In a wrist watch bracelet having band portions in overlapping position the combination comprising a coupling for joining the terminal ends thereof adjustably in relation to each other, to have one band portion overlie the other band portion, the rear face of the overlying band portion having a layer comprising a stringer and separable fastener elements along the length thereof, an operating slider for said fastener elements, the underlying band portion having a connecting link adjacent the terminal portion thereof connected to said slider.

3. A variable coupling for joining the terminal ends of flexible band members adjustably in relation to each other in overlying position to provide front portions faced in the same direction, with the rear face of the overlying member in contact with the front face of the underlying member, the overlying member comprising an under layer including longitudinally directed stringers and interengaging separable fastener elements, and an actuator, the underlying member including a link connecting the terminal portion thereof with the actuator.

4. A variable coupling for joining the terminal ends of flexible band members adjustably in relation to each other in overlying position to provide front portions faced in the same direction, with the rear face of the overlying member in contact with the front face of the underlying member, the overlying member comprising an under layer including longitudinally directed stringers and interengaging separable fastener elements, and an actuator, the underlying member including a link connecting the terminal portion thereof with the actuator, said underlying member having retainer loops for holding the overlying band member in the adjusted overlapping position.

5. In a wrist watch bracelet including flexible band members, the opposed ends whereof may be joined to a wrist watch, a coupling for the opposite ends of said band members for joining the terminal ends thereof adjustably in relation to each other and in overlapping position to provide an overlying member and an underlying member, the front portions whereof are faced in the same direction, the combination wherein the rear face of the overlying member comprises a layer including stringers and interengaging fastener elements, a link adjacent the terminal end of the underlying band member joined to an operating slider for said separable fastener elements, the terminal end of said overlying member cooperating with retainer means along the length of the underlying band member to hold the terminal end of the overlying band member adjacent said underlying band member.

6. In a wrist watch strap assembly comprising a pair of flexible band members, one of which may be joined adjustably to the other band member in overlapping position, said first band member comprising a facing layer terminating into means to attach the same to a wrist watch, the opposite end forming a tongue and an under layer stitched along the sides of said band portion and joining to the facing layer the stringers of separable fastener elements, the combination comprising a coupling including an operating slider, said slider having the end flanges joined by a central web defining a funnel, the web thereof being constricted to minimize the flare and minimize the displacement of the stringers and fasteners from the plane of the inner layer.

7. In a wrist watch band including a pair of flexible band members overlying each other adjustably in relation to each other, the opposed free ends of said overlying members having wrist watch engaging means, the combination wherein the adjacent termini are joined by a variable coupling in overlapping position to provide an outer overlying member and an underlying member faced in the same direction, the rear face of the overlying member carrying a stringer and separable elements joined along their lengths by an operating slider and a connecting link for said slider joined adjacent the end of said underlying band member.

8. In a wrist watch band including a pair of flexible band members overlying each other adjustably in relation to each other, the opposed free ends of said overlying members having wrist watch engaging means, the combination wherein the adjacent termini are joined by a variable coupling in overlapping position to provide an outer overlying member and an underlying member faced in the same direction, the rear face of the overlying member carrying a stringer having fastener elements along its length and a slider and a connecting link for said slider joined adjacent the end of said underlying band member, said slider and fastener elements having locking means for locking engagement of the slider with the fastener elements to hold said band member in adjusted overlapping relation.

9. In a wrist watch band including a pair of flexible band members overlying each other adjustably in relation to each other, the opposed free ends of said overlying members having wrist watch engaging means, the combination wherein the adjacent termini are joined by a variable coupling in overlapping position to provide an outer overlying member and an underlying member faced in the same direction, the rear face of the overlying member carrying a stringer and separable fastener elements joined along their length by an operating slider and a connecting link for said slider joined adjacent the end of said underlying band member, said connecting link comprising an actuator having locking means for locking engagement of the slider with the slide fastener elements, and retainer means on the underlying band member to hold said actuator in the locking position.

CHARLES GOLDBLATT.

REFERENCES CITED

The following references are of record in the file of this patent:

UNITED STATES PATENTS

| Number | Name | Date |
| --- | --- | --- |
| 2,054,840 | Stratham | Sept. 22, 1936 |
| 2,105,143 | Greenberg | Jan. 11, 1938 |
| 2,125,775 | Eisenman | Aug. 2, 1938 |
| 2,437,765 | Stratham | Mar. 16, 1948 |

FOREIGN PATENTS

| Number | Country | Date |
| --- | --- | --- |
| 18,288 | Great Britain | 1890 |
| 474,040 | Great Britain | 1937 |